(12) United States Patent
Bian

(10) Patent No.: US 11,747,559 B2
(45) Date of Patent: Sep. 5, 2023

(54) PHOTONIC INTEGRATED CIRCUIT STRUCTURE WITH SUPPLEMENTAL WAVEGUIDE-ENHANCED OPTICAL COUPLING BETWEEN PRIMARY WAVEGUIDES

(71) Applicant: GLOBALFOUNDRIES U.S. Inc., Malta, NY (US)

(72) Inventor: Yusheng Bian, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 0 days.

(21) Appl. No.: 17/411,106

(22) Filed: Aug. 25, 2021

(65) Prior Publication Data

US 2023/0064852 A1    Mar. 2, 2023

(51) Int. Cl.
*G02B 6/12*      (2006.01)
*G02B 6/122*     (2006.01)

(52) U.S. Cl.
CPC .. *G02B 6/1228* (2013.01); *G02B 2006/12061* (2013.01); *G02B 2006/12097* (2013.01)

(58) Field of Classification Search
CPC ........... G02B 6/1228; G02B 6/14; G02B 6/24
See application file for complete search history.

(56) References Cited

U.S. PATENT DOCUMENTS

| | | | | |
|---|---|---|---|---|
| 4,756,587 A | * | 7/1988 | Sano | G02B 6/2938 385/27 |
| 5,222,163 A | | 6/1993 | Handa et al. | |
| 5,706,373 A | * | 1/1998 | Mueller | G02F 1/3138 385/14 |
| 6,631,225 B2 | | 10/2003 | Lee et al. | |

(Continued)

FOREIGN PATENT DOCUMENTS

| CN | 110658586 A | * | 1/2020 |
|---|---|---|---|
| CN | 114460682 A | * | 5/2022 |

OTHER PUBLICATIONS

Bian et al., "Towards Low-Loss Monolithic Silicon and Nitride Photonic Building Blocks in State-of-the-Art 300mm CMOS Foundry," Frontiers in Optics/Laser Science, OSA 2020, pp. 1-2.

(Continued)

*Primary Examiner* — Michael Stahl
(74) *Attorney, Agent, or Firm* — David Cain; Hoffman Warnick LLC

(57) ABSTRACT

Disclosed is a photonic integrated circuit (PIC) structure including: a first primary waveguide, which has a first main body and a first end portion that is tapered; at least one supplemental waveguide positioned laterally adjacent to and extending beyond the first end portion of the first primary waveguide; and a second primary waveguide, which has a second main body and a second end portion that at least partially underlays/overlays the first end portion of the first primary waveguide and the supplemental waveguide(s). The arrangement the end portions of the primary waveguides and the supplemental waveguide(s) allows for mode matching conditions to be met at multiple locations at the interface between the primary waveguides, thereby creating multiple signal paths between the primary waveguides and effectively reducing the light signal power density in any one path to prevent or at least minimize any power-induced damage.

20 Claims, 9 Drawing Sheets

(56) References Cited

U.S. PATENT DOCUMENTS

| | | | |
|---|---|---|---|
| 6,950,581 B2* | 9/2005 | Bandyopadhyay | G02B 6/125 385/50 |
| 9,500,807 B2 | 11/2016 | Oka | |
| 10,429,582 B1 | 10/2019 | Bian et al. | |
| 10,746,921 B2 | 8/2020 | Bian et al. | |
| 11,493,686 B2 | 11/2022 | Bian | |
| 11,513,286 B2 | 11/2022 | Bian | |
| 11,531,164 B2 | 12/2022 | Dezfulian et al. | |
| 11,555,963 B1 | 1/2023 | Krishnamurthy et al. | |
| 2003/0007766 A1* | 1/2003 | Galarza | G02B 6/1228 385/132 |
| 2012/0230635 A1* | 9/2012 | Yoshida | G02B 6/125 385/43 |
| 2012/0288229 A1 | 11/2012 | Doerr et al. | |
| 2013/0170807 A1* | 7/2013 | Hatori | G02B 6/036 385/129 |
| 2014/0233881 A1* | 8/2014 | Hatori | G02B 6/12002 385/14 |
| 2014/0294341 A1* | 10/2014 | Hatori | G02B 6/1228 385/14 |
| 2015/0247974 A1* | 9/2015 | Painchaud | G02B 6/12004 385/28 |
| 2016/0103279 A1* | 4/2016 | Budd | G02B 6/12004 438/31 |
| 2018/0017732 A1* | 1/2018 | Tassaert | G02B 6/1228 |
| 2018/0059329 A1 | 3/2018 | Boutami et al. | |
| 2019/0086611 A1* | 3/2019 | Daniel | G02B 6/305 |
| 2020/0012045 A1 | 1/2020 | Bian et al. | |
| 2021/0215882 A1 | 7/2021 | Khan et al. | |

OTHER PUBLICATIONS

Bian et al., "Monolithically Integrated Silicon Nitride Platform," OSA 2021, pp. 1-3.

Giewont et al., "300-mm Monolithic Silicon Photonics Foundry Technology," IEEE Journal of Selected Topics in Quantum Electronics, vol. 25, No. 5, 2019, pp. 1-12.

Rakowski et al., "45nm CMOS—Silicon Photonics Monolithic Technology (45CLO) for Next-Generation, Low Power and High Speed Optical Interconnects," OSA 2020, pp. 1-3.

Sacher et al., "Monolithically Integrated Multilayer Silicon Nitride-on-Silicon Waveguide Platforms for 3-D Photonic Circuits and Devices," Proceedings of the IEEE, vol. 106, No. 12, 2018, pp. 2232-2245.

Sakai et al., "Low Loss Ultra-Small Branches in a Silicon Photonics Wire Waveguide," IEICE Trans. Electron, vol. E85-C, No. 4, 2002, pp. 1033-1038.

Shang et al., Low-Loss Compact Multilayer Silicon Nitride Platform for 3D Photonic Integrated Circuits, OSA 2015, pp. 1-9.

Sodagar et al., "High-Efficiency and Wideband Interlayer Grating Couplers in Multilayer Si/SiO2/SiN Platform for 3D Integration of Optical Functionalities," OSA 2014, pp. 1-11.

Cai et al., "Analysis of the Coupling Characteristics of a Tapered Three-Guide Coupled System," Journal of Lightwave Technology, vol. 8, No. 10, 1990, pp. 1621-1629.

Maegami et al., "Completely CMOS compatible SiN-Waveguide-Based Fiber Coupling Structure for Si Wire Waveguides," Optics Express 16856, vol. 24, No. 15, 2016, pp. 1-10.

Mu et al., "Edge Couplers in Silicon Photonic Integrated Circuits: A Review," Applied Sciences, 2020, 10, 1538, pp. 1-29.

Zhu et al., "Very High Efficiency Optical Coupler for Silicon Nanophotonic Waveguide and Single Mode Optical Fiber," Optics Express 18462, vol. 25, No. 15, 2017, pp. 1-12.

U.S. Appl. No. 17/411,122, Office Action dated Oct. 27, 2022, 12 pages.

U.S. Appl. No. 17/411,122, Final Office Action dated Feb. 1, 2023, 8 pages.

U.S. Appl. No. 17/411,122, Office Action dated Mar. 14, 2023, 12 pages.

\* cited by examiner

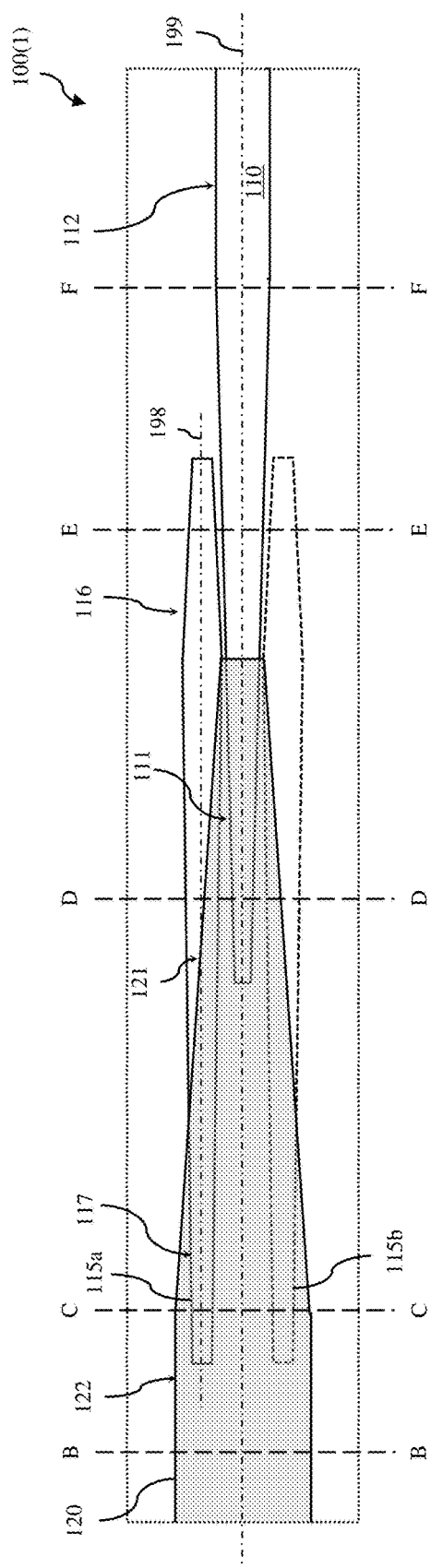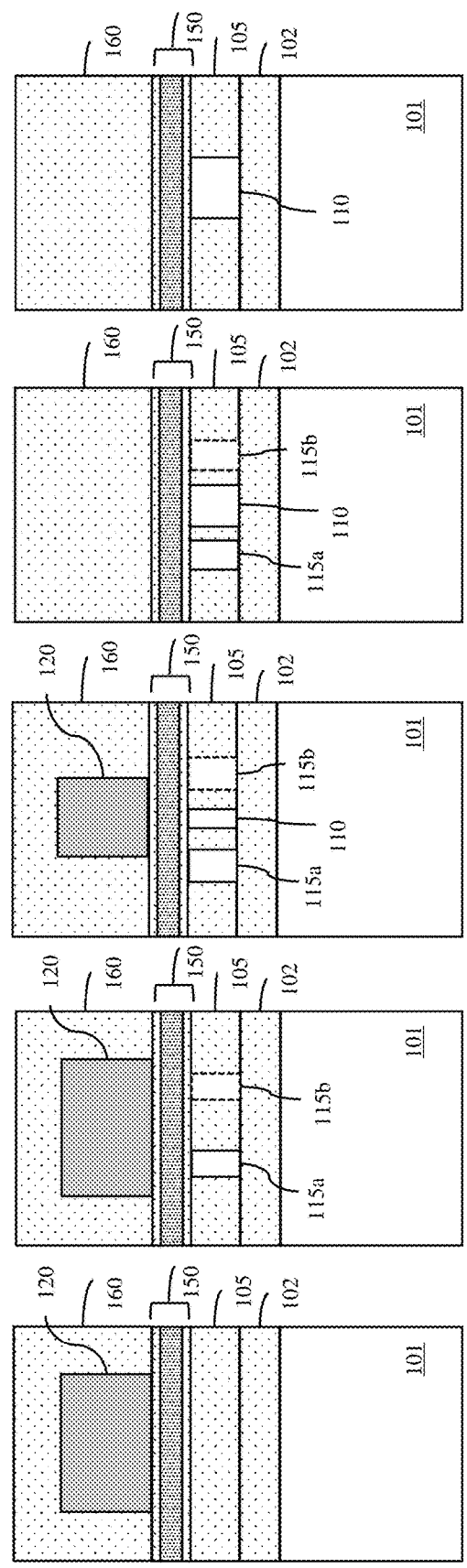
FIG. 1A
FIG. 1B
FIG. 1C
FIG. 1D
FIG. 1E
FIG. 1F

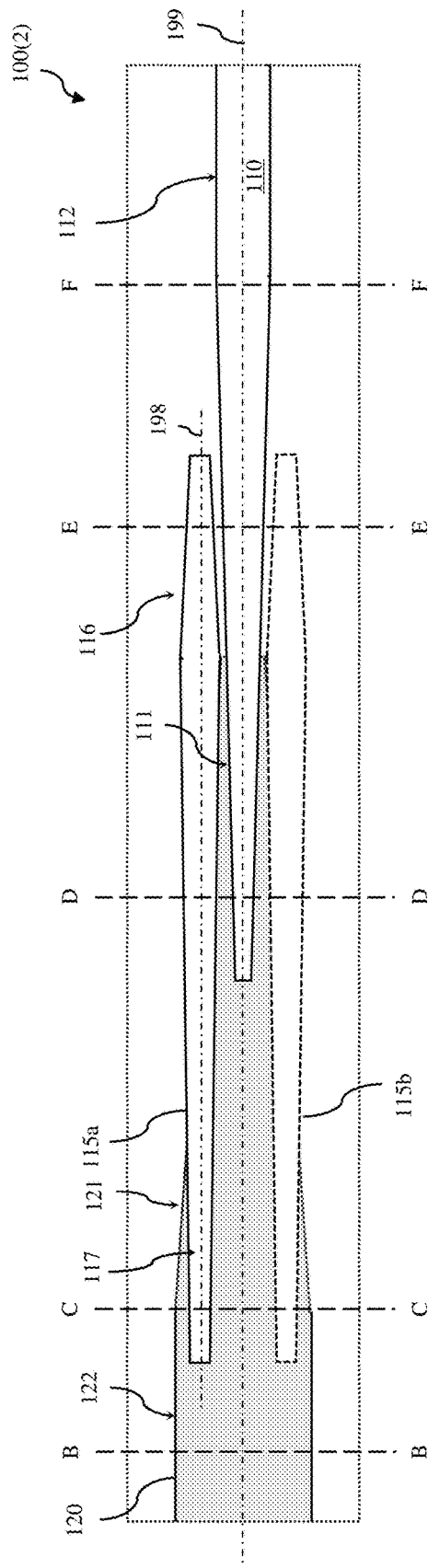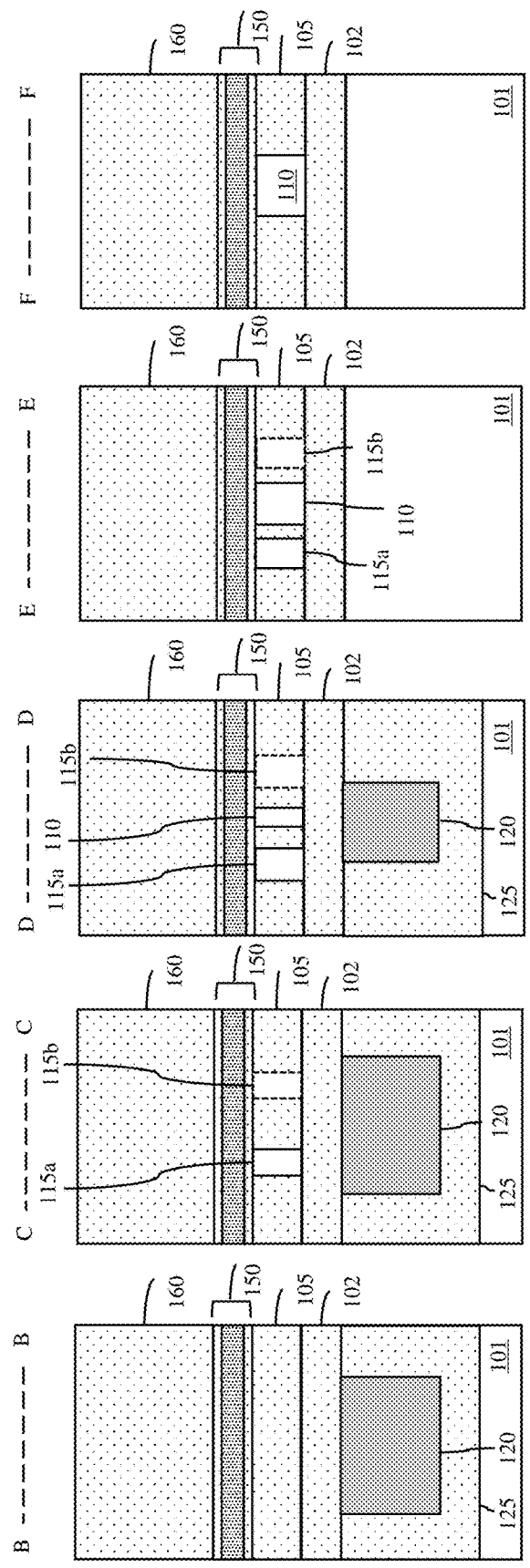

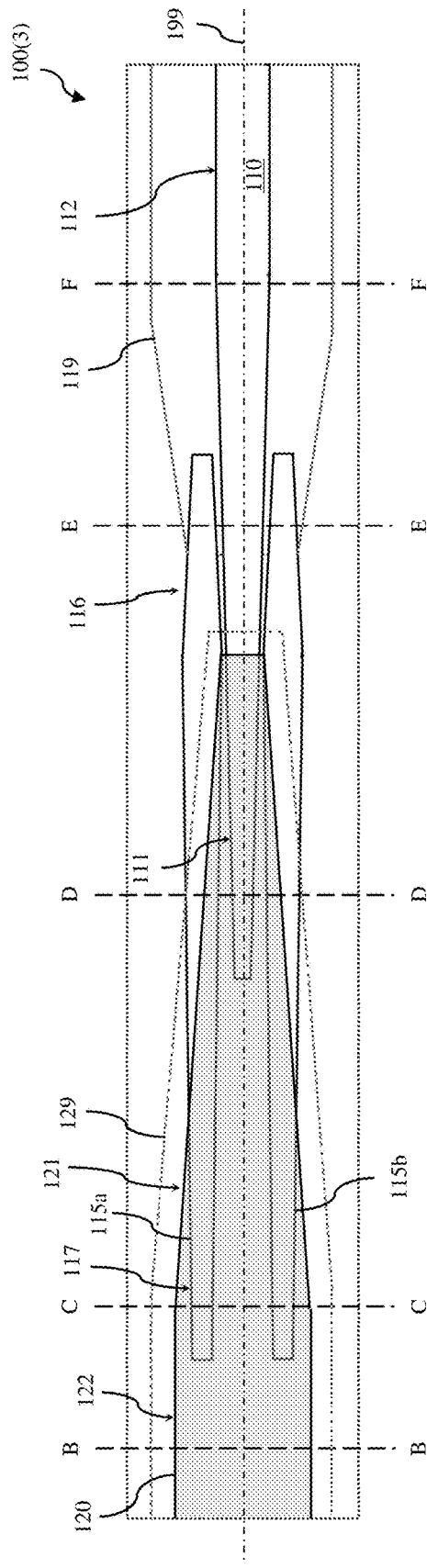
FIG. 3A
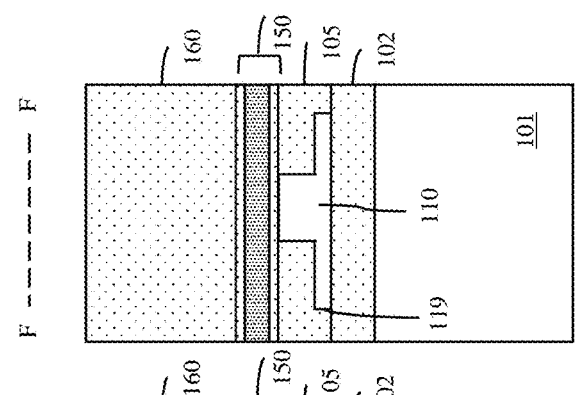
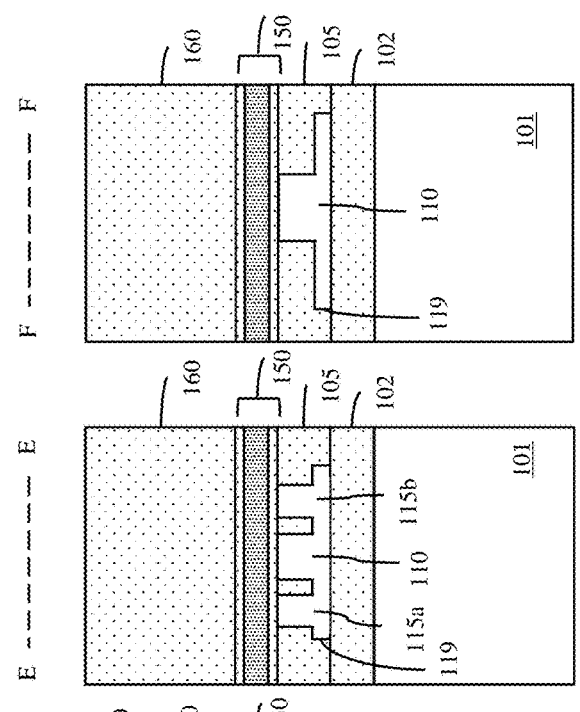
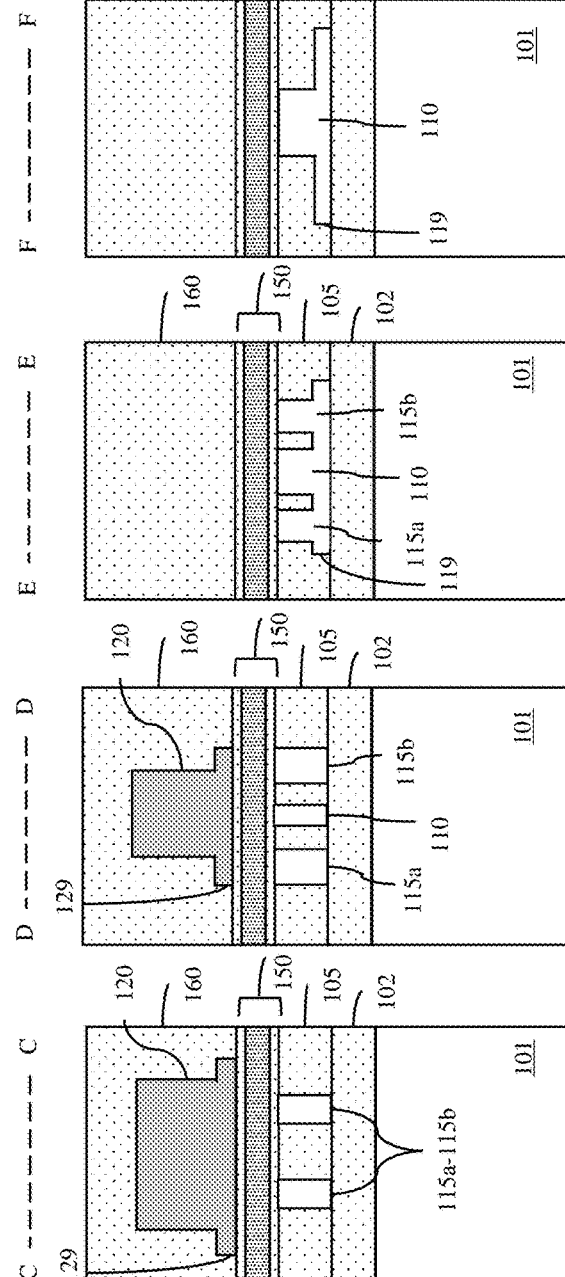
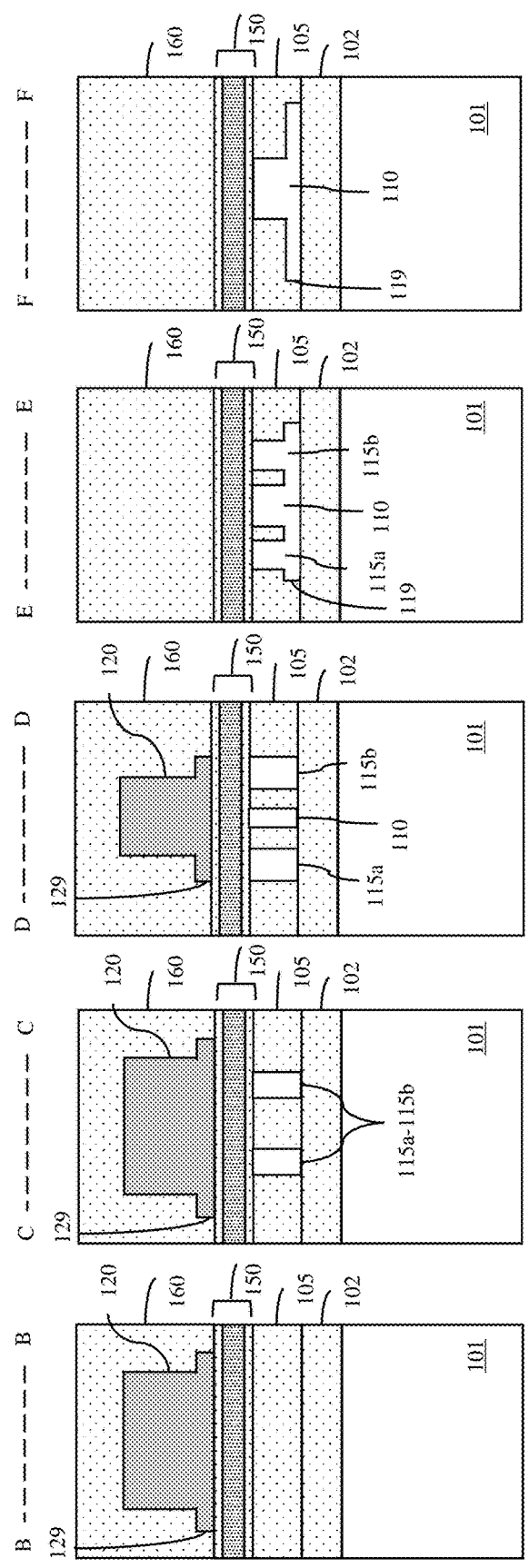
FIG. 3B
FIG. 3C
FIG. 3D
FIG. 3E
FIG. 3F

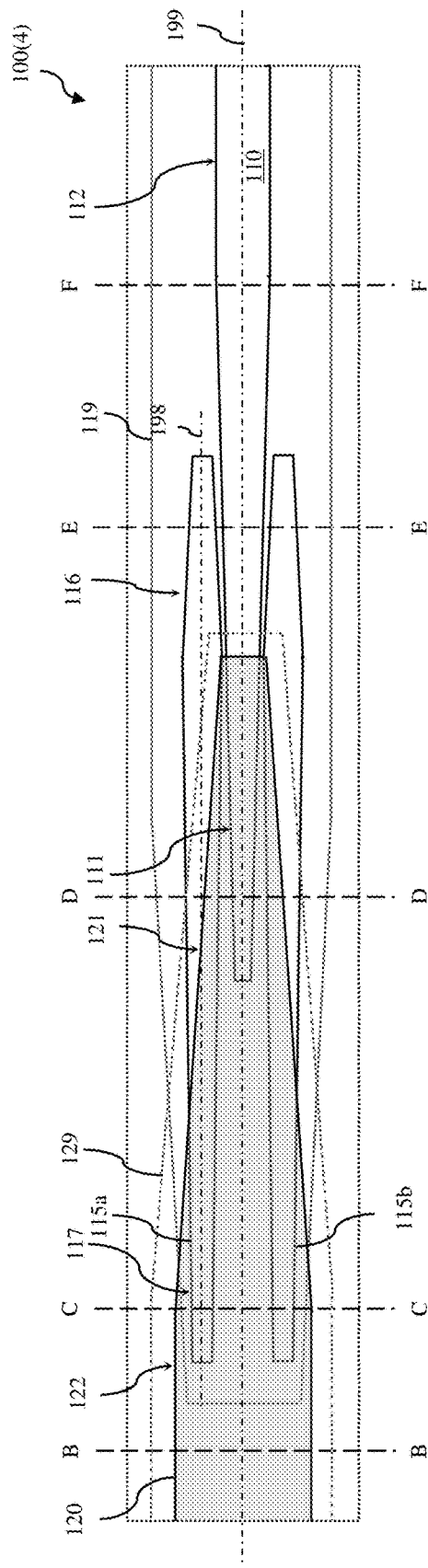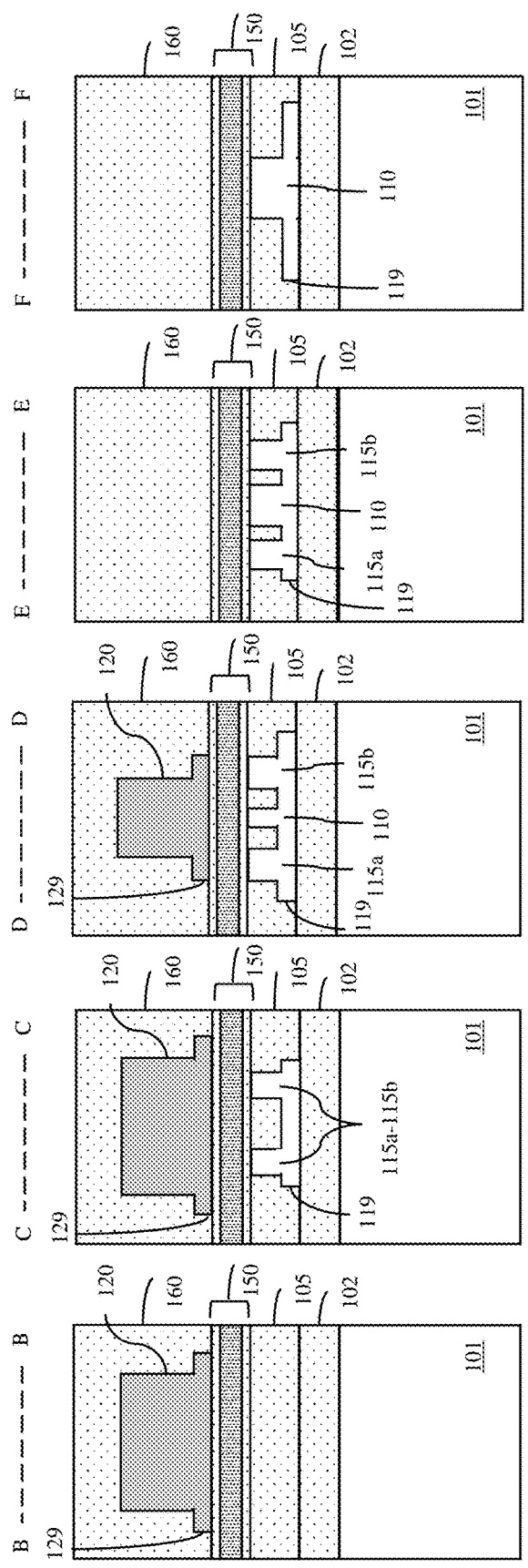
FIG. 4A
FIG. 4B
FIG. 4C
FIG. 4D
FIG. 4E
FIG. 4F

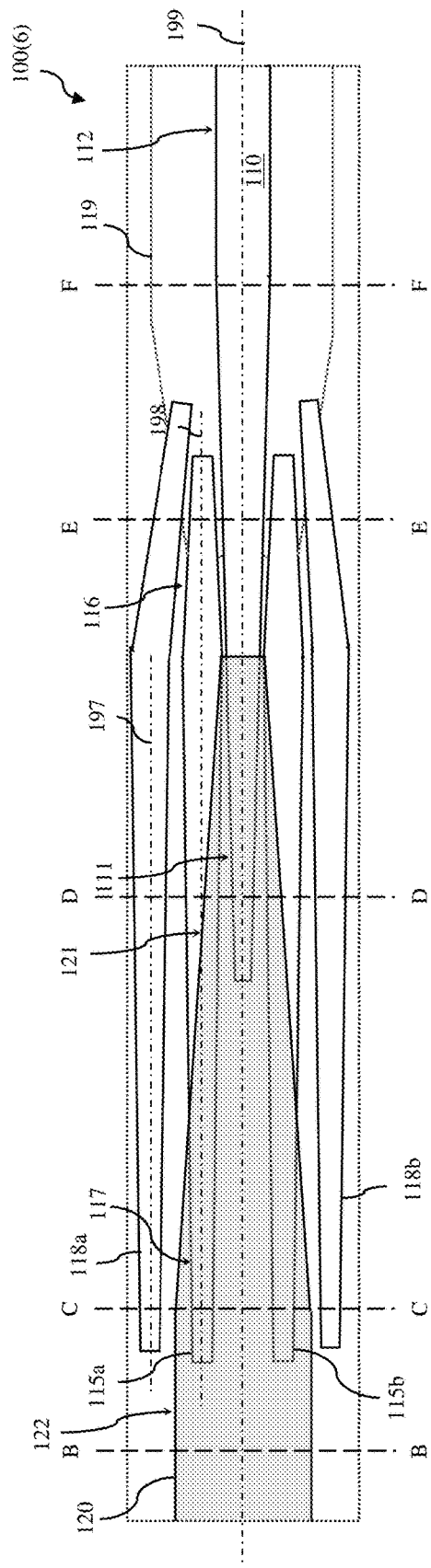
FIG. 6A
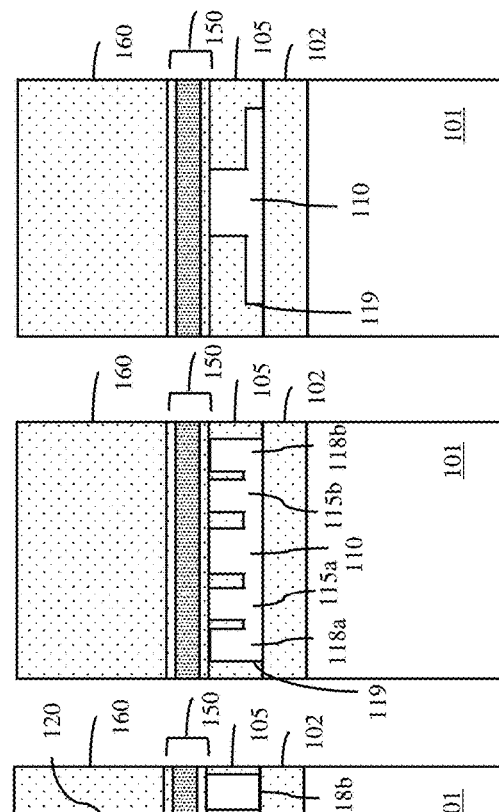
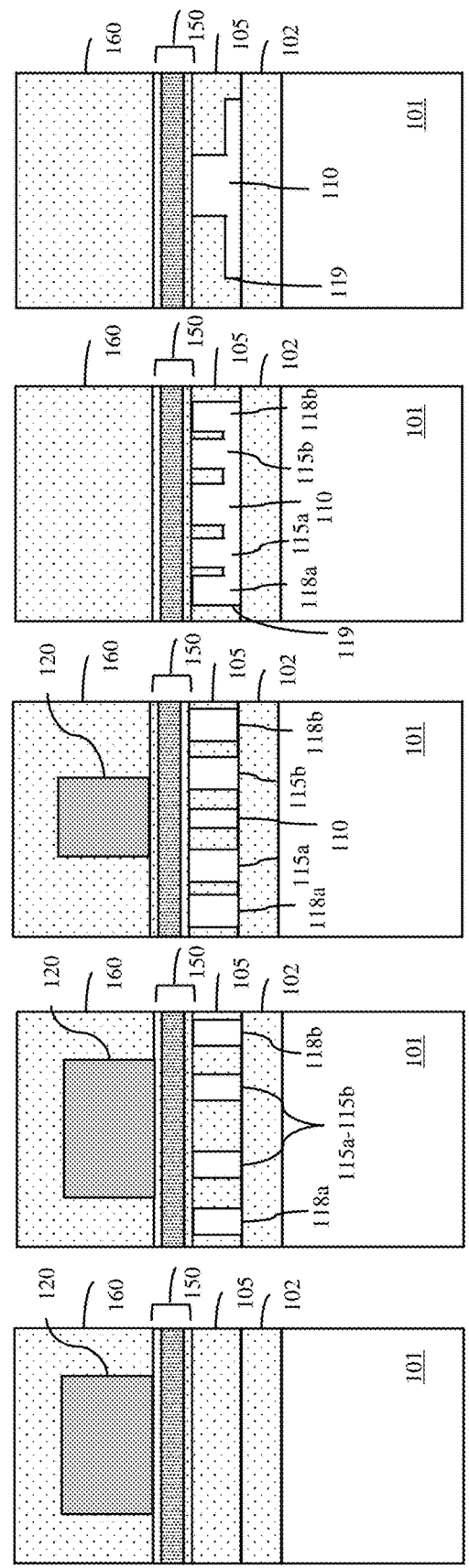
FIG. 6B  FIG. 6C  FIG. 6D  FIG. 6E  FIG. 6F

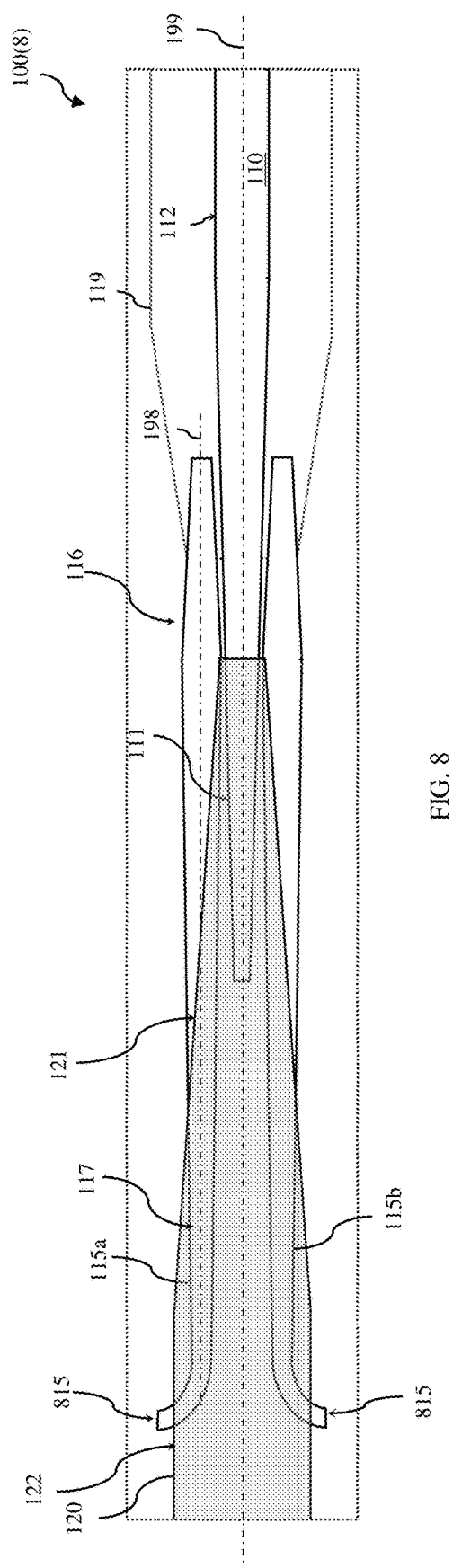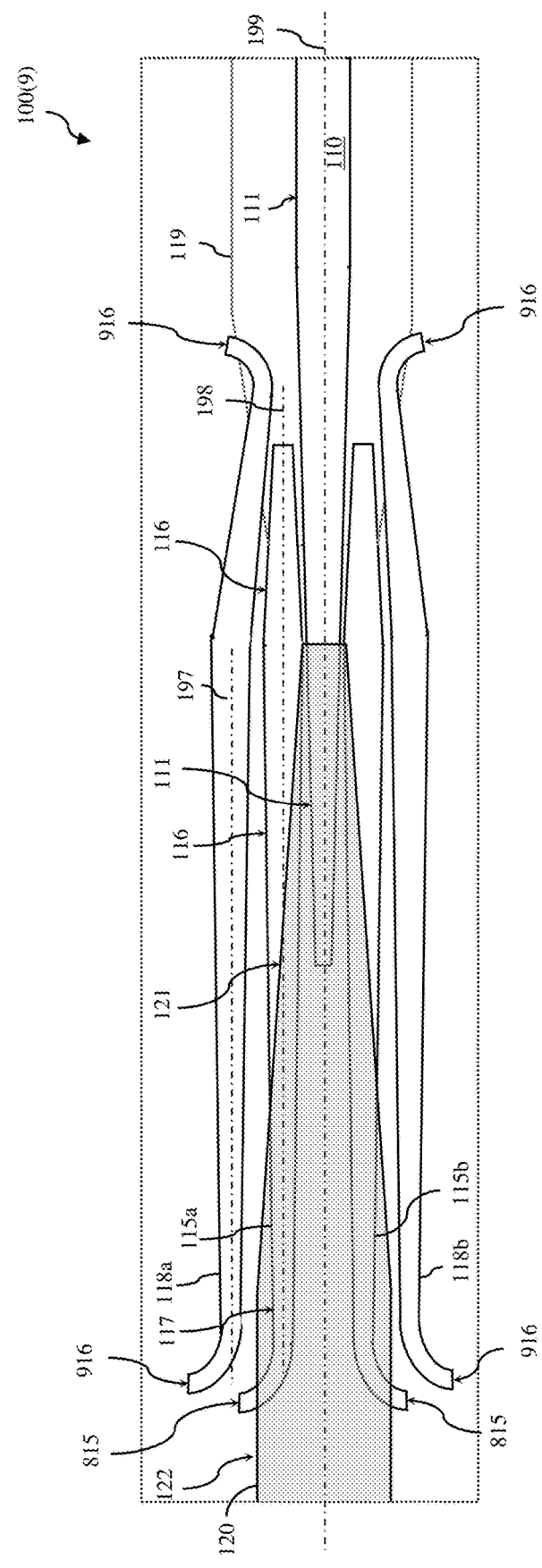

ic integrated circuit (PIC) structures and, more particularly, to embodiments of a PIC structure with enhanced optical coupling between waveguides for robustness during transmission of high power optical signals.

PHOTONIC INTEGRATED CIRCUIT STRUCTURE WITH SUPPLEMENTAL WAVEGUIDE-ENHANCED OPTICAL COUPLING BETWEEN PRIMARY WAVEGUIDES

BACKGROUND

Field of the Invention

The present invention relates to photonic integrated circuit (PIC) structures and, more particularly, to embodiments of a PIC structure with enhanced optical coupling between waveguides for robustness during transmission of high power optical signals.

Description of Related Art

In photonic integrated circuit (PIC) structures, waveguides can be configured so that optical signals can pass between the waveguides. For example, a tapered end portion of one waveguide can overlay a uniform or tapered end portion of another waveguide and sufficiently close thereto so that optical signals can pass between the two waveguides around a location, along the adjacent end portions, where mode matching occurs (i.e., where the propagation constant of optical mode inside the two waveguides becomes the same). Those skilled in the art will recognize that optical mode of light is generally determined by refractive index profile of the waveguide and its cross-sectional geometric size and shape and, for waveguides with core materials having the same refractive index profiles, mode matching between two waveguides generally occurs at a location where the cross-sectional areas of the two end portions of the two waveguides are approximately the same. For waveguides with core materials having different refractive index profiles, mode matching may still occur at a location where the two end portions may have different cross-sectional areas but the same propagation constant which is determined by the respective combinations of refractive index and cross-sectional area. On the other hand, an optical waveguide of certain material type, geometric size, etc. may have a certain threshold of power level that it can accommodate and power transmission fails have been noted when optical signals are at relatively high optical power levels (i.e., above the threshold).

SUMMARY

Generally, disclosed herein are embodiments of a photonic integrated circuit (PIC) structure. The PIC structure can include a first primary waveguide with a first main body and a first end portion adjacent to the first main body. The first end portion can be a tapered first end portion. The PIC structure can further include at least one supplemental waveguide. Each supplemental waveguide can have a proximal portion positioned laterally adjacent to the first end portion of the first primary waveguide and a distal portion that extends beyond the first end portion away from the first main body. The PIC structure can further include a second primary waveguide with a second main body and a second end portion adjacent to the second main body. The second end portion of the second primary waveguide can be positioned adjacent to the first end portion of the first primary waveguide and the distal portion of each supplemental waveguide.

In some embodiments, the PIC structure can include a first primary waveguide with a first main body and a first end portion adjacent to the first main body. The first end portion can be a tapered first end portion. The PIC structure can further include two supplemental waveguides on opposing sides of the first end portion of the first primary waveguide. Each supplemental waveguide can have a proximal portion positioned laterally adjacent to the first end portion of the first primary waveguide and a distal portion that extends beyond the first end portion away from the first main body. The PIC structure can further include a second primary waveguide with a second end portion. The second end portion of the second primary waveguide can be adjacent to and, more particularly, can at least partially overlay or underlay the first end portion of the first primary waveguide and the distal portions of the two supplemental waveguides.

In some embodiments, the PIC structure can include a first primary waveguide with a first main body and a first end portion adjacent to the first main body. The first end portion can be a tapered first end portion. The PIC structure can further include two supplemental waveguides on opposing sides of the first end portion of the first primary waveguide. Each supplemental waveguide can have a proximal portion positioned laterally adjacent to the first end portion of the first primary waveguide and a distal portion that extends beyond the first end portion away from the first main body. The PIC structure can further include a second primary waveguide with a second end portion. The second end portion of the second primary waveguide can be adjacent to and, more particularly, can at least partially overlay the first end portion of the first primary waveguide and the distal portions of the two supplemental waveguides.

In each of the disclosed PIC structure embodiments, the arrangement of the first end portion of the first primary waveguide, the second end portion of the second primary waveguide, and the supplemental waveguide(s) allows for mode matching conditions to be met at multiple locations at the interface between the first primary waveguide and the second primary waveguide, thereby creating multiple signal paths between the first and second primary waveguides and effectively reducing the light signal power density in any one path to prevent or at least minimize any power-induced damage.

BRIEF DESCRIPTION OF THE SEVERAL VIEWS OF THE DRAWINGS

The present invention will be better understood from the following detailed description with reference to the drawings, which are not necessarily drawn to scale and in which:

FIG. 1A is a layout diagram and FIGS. 1B-1F are different cross-section diagrams illustrating a disclosed embodiment of a photonic integrated circuit (PIC) structure;

FIG. 2A is a layout diagram and FIGS. 2B-2F are different cross-section diagrams illustrating another disclosed embodiment of a PIC structure;

FIG. 3A is a layout diagram and FIGS. 3B-3F are different cross-section diagrams illustrating another disclosed embodiment of a PIC structure;

FIG. 4A is a layout diagram and FIGS. 4B-4F are different cross-section diagrams illustrating another disclosed embodiment of a PIC structure;

FIG. 6A is a layout diagram and FIGS. 6B-6F are different cross-section diagrams illustrating another disclosed embodiment of a PIC structure;

FIGS. 7-9 are different layout diagrams illustrating still other disclosed embodiments, respectively, of a PIC structure.

DETAILED DESCRIPTION

Figure 10:
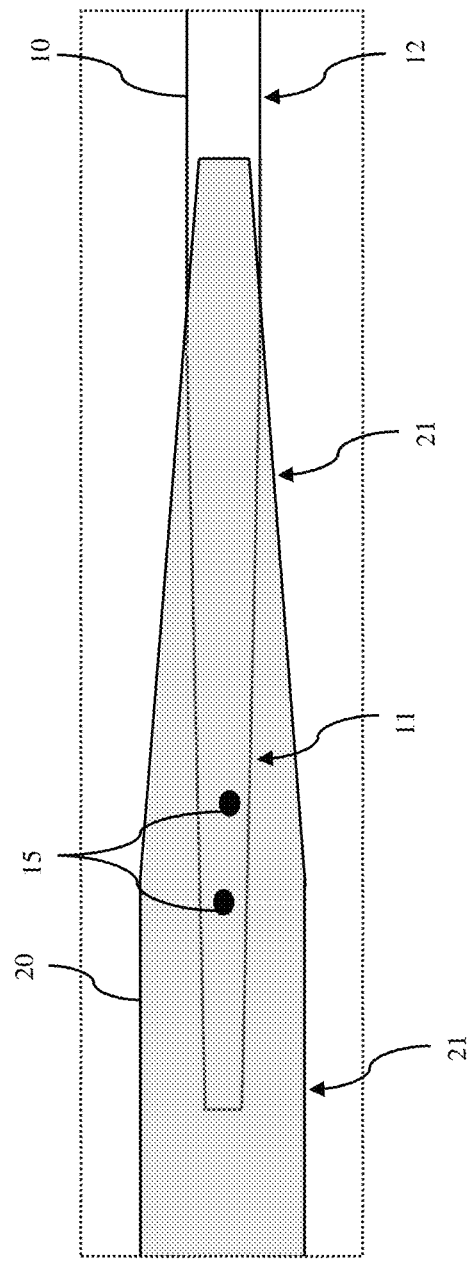
FIG. 10 is a layout diagram illustrating a prior art PIC structure.

FIG. 10 is a layout diagram illustrating an exemplary photonic integrated circuit (PIC) structure including waveguides 10 and 20. In this exemplary PIC structure, waveguide 20 has main body 22 and tapered end portion 21. Waveguide 10 has a main body 12 and a tapered end portion 11. The tapered end portion 21 of the waveguide 20 can overlay and be sufficiently close to the tapered end portion 11 of waveguide 10 such that, where mode matching conditions are met, optical signals can pass between the waveguides 10 and 20 (i.e., the waveguides 10 and 20 can be considered optically coupled). Optical signals can pass between the two waveguides at any location, along those two end portions 11 and 21, where mode matching occurs (i.e., where the propagation constant of optical mode inside the two waveguides becomes the same). Those skilled in the art will recognize that, for waveguides with core materials having the same refractive index profiles, mode matching between waveguides generally occurs at a location where the cross-sectional areas of the two end portions 11 and 21 of the two waveguides 10 and 20, respectively, are approximately the same. For waveguides with core materials having different refractive index profiles (e.g., if the waveguide 20 has a silicon nitride core material and if the waveguide 10 has a silicon core material), mode matching may still occur, particularly, at a location where the two end portions 11 and 12 have different cross-sectional areas but the same propagation constant which is determined by the respective combination of refractive index and cross-sectional area. However, transmission fails have been noted when relatively high power optical signals (i.e., optical signals above a certain threshold power level) pass from a high power tolerant waveguide (e.g., a silicon nitride waveguide, such as the waveguide 20) to a non-high power tolerant waveguide (e.g., a silicon waveguide, such as the waveguide 10). Specifically, when high power optical signals above a certain threshold are transmitted from the silicon nitride waveguide to the silicon waveguide, local areas in the tapered end portion 11 of the silicon waveguide have been found to melt creating defects 15 (referred to herein as power-induced defects). Such power-induced defects 15 can result in transmission fails.

In view of the foregoing, disclosed herein are embodiments of a photonic integrated circuit (PIC) structure with supplemental waveguide-enhanced optical coupling between primary waveguides for robustness during transmission of high power optical signals. Specifically, in the disclosed PIC structure embodiments, optical coupling between the primary waveguides is not achieved through tapered end portions of the respective primary waveguides alone, which, as discussed above, can lead to power-induced damage. Instead, each of the PIC structure embodiments can include a first primary waveguide with a first main body and a first end portion and, particularly, a tapered first end portion. Each of the PIC structure embodiments can further include at least one supplemental waveguide, which is positioned laterally adjacent to and extends beyond the first end portion of the first primary waveguide. Each of the PIC structure embodiments can also include a second primary waveguide with a second main body and a second end portion, which at least partially underlays/overlays the first end portion of the first primary waveguide and the supplemental waveguide(s). In some embodiments, the PIC structure can also include additional supplemental waveguide(s). The different PIC structure embodiments disclosed herein can vary, for example, with regard to the number of supplemental waveguides, with regard to positioning of the first primary waveguide relative to the supplemental waveguide(s), with regard to positioning of the second primary waveguide relative to the first primary waveguide and the supplemental waveguide(s), with regard to the core materials used for the first primary waveguide, supplemental waveguide(s), and the second primary waveguide, with regard to the shapes of the supplemental waveguide(s), with regard to the presence or absence of slab portions of the core material used for the first primary waveguide, supplemental waveguide(s) and the second primary waveguide, etc. In any case, the arrangement of the first end portion of the first primary waveguide, the second end portion of the second primary waveguide, and the supplemental waveguide(s) allows for mode matching conditions to be met at multiple locations at the interface between the first primary waveguide and the second primary waveguide, thereby creating multiple signal paths between the first and second primary waveguides and effectively reducing the light signal power density in any one path to prevent or at least minimize any power-induced damage.

Figure 5:
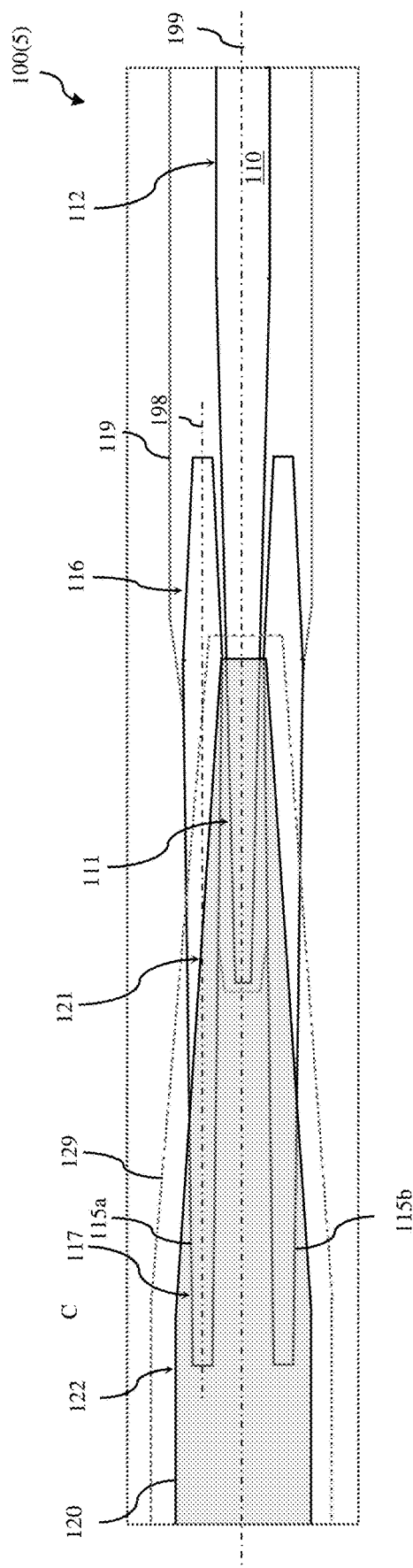
FIG. 5 is a layout diagram illustrating another embodiment of a PIC structure.
Figure 7:
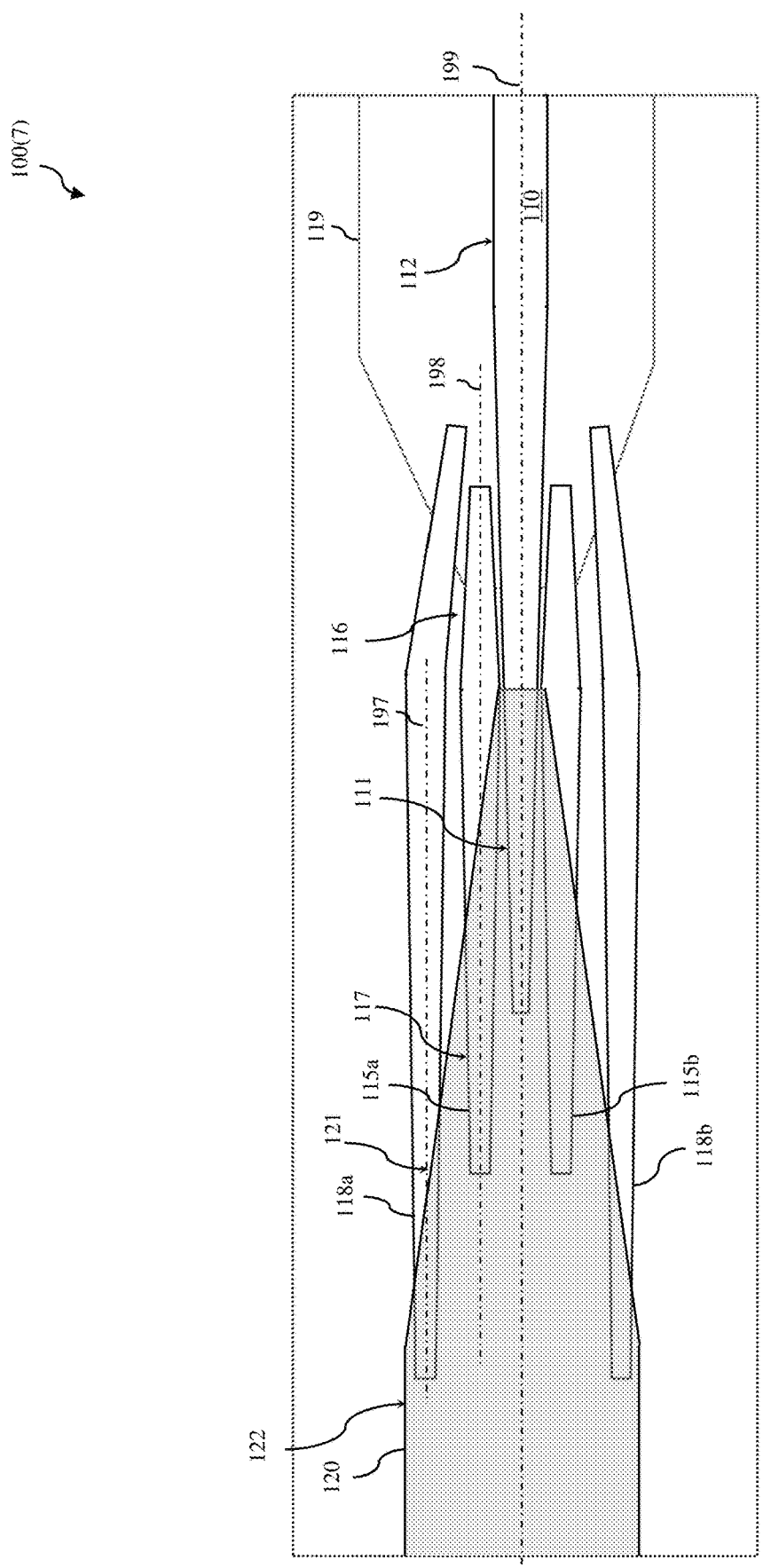

More particularly, disclosed herein are various photonic integrated circuit (PIC) structure embodiments configured to facilitate transmission of high-power optical signals between a first primary waveguide 110 (e.g., an input waveguide that receives the optical signals or, alternatively, a first input/output waveguide) and a second primary waveguide 120 (e.g., an output waveguide that transmits the optical signals or, alternatively, a second input/output waveguide) (e.g., see the exemplary PIC structure embodiments 100(1) of FIGS. 1A-1F, 100(2) of FIGS. 2A-2F, 100(3) of FIGS. 3A-3F, 100(4) of FIGS. 4A-4F, 100(5) of FIG. 5, 100(6) of FIGS. 6A-6F, 100(7) of FIG. 7, 100(8) of FIG. 8, and 100(9) of FIG. 9) without resulting in power-induced defects.

Each of the exemplary PIC structure embodiments 100(1)-100(9) can include a substrate 101. The substrate 101 can be, for example, a semiconductor substrate, such as a silicon substrate. Optionally, the PIC structure embodiments 100(1)-100(9) can further include an insulator layer 102 on the substrate 101. The insulator layer 102 can be, for example, a silicon dioxide layer (also referred to herein as a buried oxide (BOX) layer).

Each of the exemplary PIC structure embodiments 100(1)-100(9) can further include a first primary waveguide 110, such as an input waveguide or a first input/output waveguide, at a first height, as measured from the bottom surface of the substrate 101. The first primary waveguide 110 can have a first main body 112. For purposes of illustration, only a linear portion of the first main body 112 is shown. However, it should be understood that the figures are not intended to be limiting. The first main body 112 of the first primary waveguide 110 can be linear, can be curved, or can have any other suitable shape depending upon the required application. The first primary waveguide 110 can further include a first end portion 111, which extends laterally from the first main body 112. The first end portion 111 can be tapered. Specifically, the width of the first end portion 111 can taper down (i.e., decrease) from one width adjacent to the first main body 112 to another width at an end wall of the first end portion 111 farthest from the first main body 112, as illustrated. Generally, for a taper as illustrated, the width of the first end portion 111 near the first main body 111 is wider than the width at the end wall farthest from the first main body 112. It should be understood that the figures are not intended to be limiting. The width of the first end portion 111 can taper down (i.e., decrease) essentially linearly from adjacent the first main body 112 to the end wall of the first end portion 111 farthest from the first main body 112, as illustrated. Alternatively, the width of the first end portion 111 can taper down (i.e., decrease) in a stepped or exponential or other nonlinear manner from adjacent the first main body 112 to the end wall of the first end portion 111 farthest from the first main body 112. In any case, the first end portion 111 can be essentially symmetrical relative to a plane 199 that extends vertically through a center axis along the length of the first end portion 111.

Each of the exemplary PIC structure embodiments 100(1)-100(9) can further include one or more supplemental waveguides (e.g., 115a and/or 115b) at the same first height as the first waveguide 110. That is, the first primary waveguide 110 and each supplemental waveguide 115a and/or 115b can be formed on the same layer of the PIC structure such that they are at essentially the same first height, as measured from the bottom surface of the substrate 101. Each supplemental waveguide 115a and/or 115b can be a relatively short waveguide (also referred to herein as a mini-waveguide).

Each supplemental waveguide 115a and/or 115b can have a proximal portion positioned laterally adjacent to the first end portion 111 of the first primary waveguide 110 such that an end of the proximal portion 116 is at or near the first main body 112. Optionally, the proximal portion 116 can have a shape where the width tapers down (i.e., decreases) from a maximum width in two directions: one toward the first main body 112; and the other toward the end wall of the first end portion 111 farthest from the first main body 112, as illustrated. Alternatively, the proximal portion 116 can have a uniform width or can have some other suitable shape. In any case, adjacent sidewalls of each proximal portion 116 of each supplemental waveguide 115a and/or 115b and the first end portion 111 of the first primary waveguide 110 can be physically separated by a cladding material-filled space. Depending upon the shapes of the proximal portion of each supplemental waveguide and the first end portion, the shape of the cladding material-filled space can vary. Furthermore, the proximal portion 116 can be essentially symmetrical or asymmetrical relative to a plane 198 that extends vertically through a center axis along the length of the proximal portion 116. The plane 198 can be essentially parallel to the plane 199 (which as mentioned above extends vertically through a center axis along the length of the first end portion 111), as illustrated. Alternatively, can be slightly angled (e.g., by no more than 45 degrees) relative to the plane 199. In any case, each proximal portion 116 of each supplemental waveguide 115a and/or 115b is adjacent to, but physically separated from, the first end portion. However, the separation distance between the proximal portion 116 of each supplemental waveguide 115a and/or 115b is sufficiently close so that optical power may be coupled between the primary waveguide and the supplemental waveguide.

Each supplemental waveguide 115a and/or 115b can also have a distal portion 117 that extends from the proximal portion 116 beyond the first end portion 111 of the first primary waveguide and, more particularly, beyond the end wall of the first end portion 111 farthest from the first main body 112. A center axis along the length of the distal portion 117 can be in the same plane 198 as the center axis along the length of the proximal portion 116 mentioned above. Optionally, the distal portion 117 of each supplemental waveguide 115a and/or 115b can be tapered, as illustrated. That is, the width of the distal portion 117 can taper down (i.e., decrease) from one width adjacent to the proximal portion 116 to another width at an end wall farthest from the proximal portion 116. Generally, for a taper as illustrated, the width of the distal portion 117 adjacent to the proximal portion 116 is wider than the width at the end wall farthest from the proximal portion 116. Alternatively, the distal portion 117 could have an essentially uniform width or some other suitable shape. Optionally, the distal portion 117 of each supplemental waveguide 115a and/or 115b can have a curved end 815 (e.g., see curve 815 illustrated in the exemplary PIC structure embodiments 100(8) of FIG. 8 and 100(9) of FIG. 9).

Some of the exemplary PIC structure embodiments (e.g., see PIC structure embodiments 100(6) of FIGS. 6A-6F, 100(7) of FIG. 7 and 100(9) of FIG. 9) can further include one or more additional supplemental waveguides (e.g., see the additional supplemental waveguides 118a and 118b) outside the supplemental waveguide(s) 115a and/or 115b. Specifically, some embodiments can include one additional supplemental waveguide 118a positioned laterally adjacent to the supplemental waveguide 115a on one side of the first end portion 111 of the first primary waveguide 110 and another additional supplemental waveguide 118b positioned laterally adjacent to the supplemental waveguide 115b on the opposite side of the first end portion 111 of the first primary waveguide 110.

Each additional supplemental waveguide 118a and/or 118b can be at the same first height as the first waveguide 110 and supplemental waveguide(s) 115a and/or 115b. That is, the additional supplemental waveguide(s) 118a and/or 118b can be formed on the same layer of the PIC structure as the first primary waveguide 110 and the supplemental waveguide(s) 115a and/or 115b such that they are at essentially the same first height, as measured from the bottom surface of the substrate 101. Each additional supplemental waveguide 118a and/or 118b can be a relatively short waveguide (i.e., a mini-waveguide). Each additional supplemental waveguide 118a and/or 118b can have proximal and distal portions positioned laterally adjacent to the proximal and distal portions 116-117, respectively, of an adjacent supplemental waveguide 115a and/or 115b. Optionally, the proximal portion of each additional supplemental waveguide can have a shape where the width tapers down (i.e., decreases) from a maximum width in two directions: in one direction toward the first main body 112; and in another direction toward the end wall of the first end portion 111 farthest from the first main body, as illustrated. Alternatively, the proximal portion of each additional supplemental waveguide could have an essentially uniform width or some other suitable shape. Optionally, the distal portion of each additional supplemental waveguide can taper down (i.e., decrease) from one width adjacent to the proximal portion of that waveguide to another width at an end wall farthest from the proximal portion. Generally, for a taper as illustrated, the width of the distal portion adjacent to the proximal portion is wider than the width at the end wall farthest from the proximal portion. Alternatively, the distal portion of each additional supplemental waveguide can have an essentially uniform width or some other suitable shape. In any case, each additional supplemental waveguide can be adjacent to, but physically separated from, a supplemental waveguide. However, the separation distance between the additional supplemental waveguide and the adjacent supplemental waveguide is sufficiently close so that optical power may be coupled between the additional supplemental waveguide and the adjacent supplemental waveguide.

Optionally, one or both of the opposing ends of each additional supplemental waveguide 118a and/or 118b can be curved (e.g., see the curved ends 916 of the additional supplemental waveguides 118a-118b in the exemplary PIC structure embodiment 100(9) of FIG. 9).

It should be noted that a plane 197 that extends vertically through a center axis along the length of each additional supplemental waveguide 118a and/or 118b (excluding any curved or angled ends) can be essentially parallel to the planes 198 and 199 (discussed above), as illustrated. Alternatively, the plane 197 can be slightly angled (e.g., by no more than 45 degrees) relative to either plane 198 and/or 199. In any case, the additional supplemental waveguide(s) 118a and/or 118b can be essentially the same length or longer than the adjacent supplemental waveguide(s) 115a and/or 115b. Additionally, it should be understood that the figures are not intended to be limiting with respect to the total number of supplemental waveguides. For example, while only two or four total supplemental waveguides are shown in the figures, the total number of supplemental waveguides could be one or more and the total number could be an even number or an odd number such that the structure is symmetric or asymmetric about the first primary waveguide.

As mentioned above, first waveguide 110 (including the first main body 112 and the first end portion 111) and any supplemental waveguides 115a and/or 115b and optionally 118a and/or 118b are at the same first height relative to the bottom surface of the substrate. Thus, the first waveguide 110 (including the first main body 112 and the first end portion 111) and any supplemental waveguides 115a and/or 115b and optionally 118a and/or 118b can be made of the same first core material. In some embodiments, the first core material can be semiconductor material (e.g., silicon, polysilicon, silicon germanium, or polysilicon germanium) or some other core material that is prone to power-induced defects.

Each of the exemplary PIC structure embodiments 100(1)-100(9) can further include a second primary waveguide 120 with a second main body 122. For purposes of illustration, only a linear portion of the second main body 122 is shown. However, it should be understood that the figures are not intended to be limiting. The second main body 122 of the second primary waveguide 120 can be linear, can be curved, or can have any other suitable shape depending upon the required application.

The second primary waveguide 120, such as an output waveguide or a second input/output waveguide, can further have a second end portion 121, which extends laterally from the second main body 122. Optionally, the second end portion 121 can taper down (i.e., decrease) from one width adjacent to the second main body 122 to another width at the end wall of the second end portion 121 farthest from the second main body 122, as illustrated. Generally, for a taper as illustrated, the width of the second end portion 121 adjacent to the second main body 122 is wider than the width at the end wall farthest from the second main body 122. The width of the second end portion 121 can taper down (i.e., decrease) essentially linearly from adjacent the second main body 122 to the end wall of the second end portion 121 farthest from the second main body 122, as illustrated. Alternatively, the width of the second end portion 121 can taper down (i.e., decrease) in a stepped or exponential or other nonlinear manner from adjacent the second main body 112 to the end wall farthest from the second main body 122. Alternatively, the second end portion 121 could have a uniform width as opposed to being tapered (not shown). In this case, the uniform width of the second end portion 121 can still be greater than the maximum width of the first end portion 111. In any case, the second end portion 121 can be essentially symmetrical relative to the plane 199, which extends vertically through a center axis along the length of the second end portion 121 and which, as discussed above, also extends vertically through a center axis along the length of the first end portion 111. As illustrated, the maximum and minimum widths of the second end portion 121 of the second primary waveguide 120 can be greater than the maximum and minimum widths, respectively, of the first end portion 111 of the first primary waveguide 110.

Within the PIC structure, the second primary waveguide 120 can be at a different height than the first primary waveguide 110 and supplemental waveguide(s) relative to the bottom surface of the substrate 101. That is, the first primary waveguide 110 and supplemental waveguide(s) can be at the first height, as measured from the bottom surface of the substrate 101, and the second primary waveguide 120 can be at a second height, which is different from the first height, as measured from the bottom surface of the substrate 101. In some embodiments, the second height can be higher than the first height. That is, the second primary waveguide 120 can be above the first primary waveguide 110 and supplemental waveguide(s), as shown in the exemplary PIC structure embodiments 100(1) of FIGS. 1A-1F, 100(3) of FIGS. 3A-3F, 100(4) of FIGS. 4A-4F, 100(5) of FIG. 5, 100(6) of FIGS. 6A-6F, 100(7) of FIG. 7, 100(8) of FIG. 8 and 100(9) of FIG. 9. In some embodiments, the second height can be lower than the first height. That is, the second primary waveguide 120 can be below the first primary waveguide 110 and supplemental waveguide(s), as shown in the exemplary PIC structure embodiment 100(2) of FIGS. 2A-2F.

In each of the exemplary PIC structure embodiments, the second primary waveguide 120 can be made of a second core material. Optionally, the second core material can be different from the first core material. For example, as mentioned above, in some embodiments of the PIC structure, the first core material of the first primary waveguide 110 could be a semiconductor material (e.g., silicon, polysilicon, silicon germanium, or polysilicon germanium) or some other core material that is prone to power-induced defects. The second core material of the second primary waveguide 120 could be silicon nitride, aluminum nitride, or some other second core material that is different from the first core material.

In any case, in each of the exemplary PIC structure embodiments 100(1)-100(9), the second end portion 121 of the second primary waveguide 120 can at least partially underlay or partially overlay (as applicable, depending upon whether the second primary waveguide is below or above the first primary waveguide) the first end portion 111 of the first primary waveguide 110 and the distal portion 117 of each supplemental waveguide 115a and/or 115b. In either case, the second end portion 121 of the second primary waveguide 120 is adjacent, but physically separated from, the first end portion 111 of the first primary waveguide 110 and the distal portion 117 of each supplemental waveguide. However, the separation distance is sufficiently close so that optical power may be coupled between the second end portion 121 of the second primary waveguide 120 and both the first end portion 111 of the first primary waveguide 110 and the distal portion 117 of each supplemental waveguide.

It should be noted that if both the first end portion 111 and the second end portion 121 are tapered, tapering will be in opposite directions.

Furthermore, in the exemplary PIC structure embodiments that include at least one additional supplemental waveguide (e.g., 118a and/or 118b), the second end portion 121 of the second primary waveguide 120 can be entirely offset from the additional supplemental waveguide(s) (e.g., see the exemplary PIC structure embodiments 100(6) of FIGS. 6A-6F or 100(9) of FIG. 9, where the second end portion 121 of the second primary waveguide does not overlay any part of the additional supplemental waveguides 118a and 118b). Alternatively, in PIC structure embodiments that include at least one additional supplemental waveguide (e.g., 118a and/or 118b), the second end portion 121 of the second primary waveguide 120 can at least partially underlay or partially overlay (as applicable) each additional supplemental waveguide (e.g., see the exemplary PIC structure embodiment 100(7) of FIG. 7). In each of these PIC structure embodiments, the separation distance between the second end portion 121 of the second primary waveguide 120 and the distal portion of each additional supplemental waveguide can be sufficiently close to allow for optical coupling therebetween.

In any case, each of the waveguide components 110, 115a-115b, 118a-118b, and 120 can be surrounded (i.e., on the top, bottom, side walls and end walls) by suitable cladding material to facilitate propagation of optical signals therethrough. Those skilled in the art will recognize that, to facilitate optical signal propagation through an optical waveguide, the waveguide material (also referred to as the core material) should have a first refractive index and should be surrounded by cladding material that has a second refractive index that is smaller than the first refractive index. For example, silicon can have a refractive index that can vary from approximately 3.3 to approximately 3.6 as a function of variations in temperature and wavelength. Thus, for example, if the core material of a given waveguide is silicon, then suitable cladding material could be silicon dioxide with a refractive index smaller than 1.6, silicon nitride with a refractive index smaller than 2.1, or any other suitable insulator material with a refractive index that is smaller than the lowest refractive index of silicon. Also, for example, if the core material of a given waveguide is silicon nitride with a refractive index of approximately 2.0 or aluminum nitride with a refractive index of approximately 2.16, then suitable cladding material could be silicon dioxide with a refractive index smaller than 1.6 or any other suitable insulator material with a refractive index that is smaller than the lowest refractive index of silicon.

In each of the exemplary PIC structure embodiments 100(1)-100(9), the first primary waveguide 110, each supplemental waveguide (e.g., 115a and/or 115b) and any additional supplemental waveguides are shown, for illustration purposes, as being above and immediately adjacent to the insulator layer 102. In this case, the first primary waveguide 110, each supplemental waveguide (e.g., 115a and/or 115b) and any additional supplemental waveguides (e.g., 118a and/or 118b, if included) can be patterned and etched into desired shapes (as described above) from a first core material layer immediately adjacent to the top surface of the insulator layer 102. The first core material layer can be, for example, a semiconductor layer such as a single crystalline silicon layer (i.e., the first core material can be silicon). Alternatively, the first core material layer could be some other suitable type of semiconductor layer such as a polysilicon layer, a germanium layer, a silicon germanium layer, etc. (i.e., the first core material could, alternatively, be polysilicon, germanium, silicon germanium, etc.). Alternatively, the first core material layer could be a layer of some other suitable waveguide core material. In any case, as discussed above, the materials of the insulator layer 102 and first core material layer should be selected so that the insulator layer 102 can effectively function as cladding material for the first primary waveguide 110 and the supplemental waveguide(s). Thus, the insulator layer 102 is also referred to herein as a first cladding material layer.

It should be noted that, during processing, the shapes of the first primary waveguide 110, each supplemental waveguide (e.g., 115a and/or 115b) and any additional supplemental waveguides (e.g., 118a and/or 118b, if included) can be patterned and etched completely through the first core material layer such that they are considered ridge waveguides. That is, the etch process used to form these components can stop on the insulator layer 102 such that the first primary waveguide 110 and supplemental waveguide(s) are discrete shapes with sidewalls that extend upward from the top surface of the insulator layer 102 (e.g., see the exemplary PIC structure embodiments 100(1) of FIGS. 1A-1F and 100(2) of FIGS. 2A-2F). Alternatively, during processing the shapes of the first primary waveguide 110, each supplemental waveguide (e.g., 115a and/or 115b) and any additional supplemental waveguides (e.g., 118a and/or 118b, if included) can be patterned and etched into the upper portion only of the first core material layer such that they are considered rib waveguides. That is, the etch process used to form these components can stop above a lower portion of the first core material layer such that the first primary waveguide 110 and the supplemental waveguide(s) have sidewalls that extend upward from the lower portion of the first core material layer, which is referred to herein as a first slab portion 119. Furthermore, before or after the shapes for the first primary waveguide 110 and the supplemental waveguide(s) are patterned and etched into the upper portion of the first core material layer, the shape of the first slab portion 119 can optionally be patterned and etched. For example, see the exemplary PIC structure embodiment 100(4) of FIGS. 4A-4F, where the first slab portion 119 has a shape with an end portion that is tapered in the same direction as the first end portion, where the first primary waveguide 110 and two supplemental waveguides 115a-115b are entirely on the first slab portion 119 such that their sidewalls extend vertically upward from the first slab portion 119, and where the second end portion 121 of the second primary waveguide 120 at least partially overlays the end portion of the first slab portion 119.

In some embodiments, the shapes of the first primary waveguide 110, each supplemental waveguide (e.g., 115a and/or 115b) and any additional supplemental waveguides (e.g., 118a and/or 118b, if included) can be patterned and etched and the shape of the first slab portion 119 can be patterned and etched so that the first primary waveguide 110 and supplemental waveguide(s) have some regions that are etched only into the upper portion of first core material layer and other regions that are etched completely through the first core material layer (i.e., so that some regions of these waveguides are rib-type and so that some regions of these waveguides are ridge-type).

For example, see the exemplary PIC structure embodiments 100(3) of FIGS. 3A-3F and 100(8) of FIG. 8 where the first main body 112 has sidewalls that extend upward from the first slab portion 119, where the first end portion 111 of the first primary waveguide 110 has sidewalls that extend upward from the insulator layer 102, where each supplemental waveguide 115a and 115b has sidewalls that extend upward from the insulator layer 102 (except at one end portion that abuts the first slab portion 119), and where the second end portion 121 of the second primary waveguide does not overlay the tapered end portion of the first slab portion 119.

See also the exemplary PIC structure embodiment 100(5) of FIG. 5 where the sidewalls of the first primary waveguide 110 (including the sidewalls of the first main body 112 and the sidewalls of the first end portion 111) extend upward from the first slab portion 119, where at least the sidewall of the proximal portion 116 of each supplemental waveguide 115a and 115b adjacent to the first end portion 111 of the first primary waveguide 110 extends upward from the first slab portion 119, where the sidewalls of the distal portion 117 of each supplemental waveguide 115a and 115b extend upwards from the insulator layer 102, and where the second end portion 121 of the second primary waveguide 120 at least partially overlays the tapered end portion of the first slab portion 119.

See also the exemplary PIC structure embodiments 100(6) of FIGS. 6A-6F, 100(7) of FIG. 7 and 100(9) of FIG. 9 where the first main body 112 of the first primary waveguide 110 has sidewalls that extend upward from the first slab portion 119, where the first end portion 111 of the first primary waveguide 110 has sidewalls that extend upward from the insulator layer 102, where each supplemental waveguide 115a and 115b as well as each additional supplemental waveguide 118a and 118b has sidewalls that extend upward from the insulator layer 102 (except at one end that abuts the first slab portion 119), and where the second end portion 121 of the second primary waveguide does not overlay the tapered end portion of the first slab portion 119.

As mentioned above, the first primary waveguide 110, each supplemental waveguide 115a and/or 115b, and any additional supplemental waveguide 118a and/or 118b (if included) can be surrounded by suitable cladding material to facilitate propagation of optical signals therethrough. Thus, the exemplary PIC structure embodiments 100(1)-100(9) can further include a second cladding material layer 105 on the top surface of the insulator layer 102 laterally surrounding and filling the spaces between the first primary waveguide 110, the supplemental waveguides 115a and/or 115b and further laterally surrounding and filling the spaces between the supplemental waveguides 115a and/or 115b and any additional supplemental waveguides 118a and/or 118b. The second cladding material layer 105 can be, for example, another silicon dioxide layer or some other suitable cladding material depending upon the first core material of the first primary waveguide 110. Top surfaces of the second cladding material layer 105, the first primary waveguide 110 and the supplemental waveguide(s) can essentially coplanar.

Additionally, at least one additional cladding material layer 150 can cover the top surfaces of the second cladding material layer 105, the first primary waveguide 110, and the supplemental waveguide(s).

As illustrated, in some embodiments, multiple additional cladding material layers 150 (e.g., two layers, three layers, etc.) could be stacked on the top surfaces of the second cladding material layer 105, the first primary waveguide 110, and the supplemental waveguide(s). The additional cladding material layers 150 could include, for example, a silicon nitride layer sandwiched between two thin silicon dioxide layers.

In other embodiments, a relatively thick additional cladding material layer 150 could be on the top surfaces of the second cladding material layer 105, the first primary waveguide 110, and the supplemental waveguide(s). This relatively thick additional cladding material layer could be, for example, a relatively thick silicon dioxide layer.

In still other embodiments, the additional cladding material layer(s) could have different sections (e.g., a first section and a second section) with different configurations (e.g., different numbers of layers and materials). For example, the first section, including a silicon nitride layer between two thin silicon dioxide layers, could be on the top surface of the first main body 112 of the first primary waveguide 110 (but not on the top surface of the first end portion 111) and could further extend laterally onto a portion of the top surface of the second cladding material layer 105 adjacent thereto. Optionally, in this first section, the silicon nitride layer could be a thin layer (e.g., a slab) patterned so as to have a main body that is aligned above and wider than the first main body of the first primary waveguide and so as to have an end portion with a width that is tapered in the same direction as the tapering of the first end portion 111. The second section, including only a relatively thick silicon dioxide layer, could be on the top surface of the first end portion 111 of the first primary waveguide 110, on the top surfaces of supplemental waveguide(s), and on portions of the top surface of the second cladding material layer 105 adjacent thereto.

In any case, one or more layers of interlayer dielectric (ILD) material 160 can be on the additional cladding material layer(s) 150. The ILD material 160 can be, for example, a silicon dioxide.

For purposes of illustration, the first primary waveguide 110 and supplemental waveguide(s) are described above and shown in the figures as being patterned from a semiconductor layer immediately adjacent to the top surface of the insulator layer 102. However, it should be understood that the figures and description are not intended to be limiting. Although not shown, alternatively, the first primary waveguide 110 and supplemental waveguide(s) could be patterned from some other type of core material layer, which is immediately adjacent to the top surface of the insulator layer 102 or which is at some distance above or below the top surface of the insulator layer.

In any case, as mentioned above, the second primary waveguide 120 can be at a different height than the first primary waveguide 110 and the supplemental waveguide(s) and can be made of a second core material, which is, optionally, different from the first core material of the first primary waveguide 110 and the supplemental waveguide(s).

In the exemplary PIC structure embodiments 100(1) of FIGS. 1A-1F, 100(3) of FIGS. 3A-3F, 100(4) of FIGS. 4A-4F, 100(5) of FIG. 5, 100(6) of FIGS. 6A-6F, 100(7) of FIG. 7, 100(8) of FIG. 8, and 100(9) of FIG. 9, the second primary waveguide 120 is shown as being above the first primary waveguide 110 and supplemental waveguide(s). In this case, the second primary waveguide 120 can be embedded within the ILD material 160 such that it is immediately adjacent to the top surface of the uppermost additional cladding material layer 150 (as shown) or, alternatively, such that it is some distance above the top surface of the uppermost additional cladding material layer 150. Thus, for example, if the ILD material 160 (which functions as cladding for the second primary waveguide) and at least the uppermost additional cladding material layer 150 (which can also function as cladding for the second primary waveguide, e.g., if contacting the second primary waveguide) are silicon dioxide with a refractive index smaller than 1.6, then the second core material of the second primary waveguide 120 could be silicon nitride with a refractive index of approximately 2.0 or aluminum nitride with a refractive index of approximately 2.16.

In some embodiments, during processing, the shape of the second primary waveguide 120 can be patterned and etched completely through a second core material layer that is immediately adjacent to the top surface of the uppermost additional cladding material layer 150 such that the second primary waveguide 120 is a ridge waveguide. That is, the etch process used to form the second primary waveguide 120 can stop on the uppermost additional cladding material layer 150 such that the second primary waveguide 120 is a discrete shape with sidewalls that extend upward from the top surface of the uppermost additional cladding material layer 150 (e.g., see the exemplary PIC structure embodiment 100(1) of FIGS. 1A-1F). Alternatively, during processing, the shape of the second primary waveguide 120 can be patterned and etched into the upper portion only of the second core material layer such that the second primary waveguide 120 is a rib waveguide. That is, the etch process used to form the second primary waveguide can stop above a lower portion of the second core material layer such that the second primary waveguide 120 has sidewalls that extend upward from the lower portion of the second core material layer, which is referred to herein as a second slab portion 129. Before or after the shape for the second primary waveguide is patterned and etched into the upper portion of the second core material layer, the shape of the second slab portion 129 can optionally be patterned and etched. For example, see the exemplary PIC structure embodiments 100(3) of FIGS. 3A-3F, 100(4) of FIGS. 4A-4F, and 100(5) of FIG. 5, where the second slab portion 129 has a shape with an end portion tapered in the same direction as the second end portion 121 and where the second primary waveguide 120 is entirely on the second slab portion 129 such that the sidewalls extend vertically upward from the second slab portion 129.

In the exemplary PIC structure embodiment 100(2) of FIGS. 2A-2F, the second primary waveguide 120 is shown as being below the first primary waveguide 110 and supplemental waveguide(s). In this case, the second primary waveguide 120 can be embedded in the substrate 101. Specifically, the substrate 101 can include a trench that is line with a layer 125 of a suitable cladding material (e.g., silicon dioxide) and filled with the second core material (e.g., silicon nitride), thereby creating the second primary waveguide 120. It should be noted that the layer 125 should be sufficiently thick to prevent leakage of optical signals into the substrate. The insulator layer 102 can be on the top surface of the substrate 101 over the second primary waveguide 120. The first primary waveguide 110 and any supplemental waveguide(s) can be on the insulator layer 102 and aligned with the second end portion 121 of the second primary waveguide 120, as discussed above.

In each of the above-described PIC structure embodiments 100(1)-100(9), the supplemental waveguide(s) (including each supplemental waveguide 115a and/or 115b and any additional supplemental waveguide 118a and/or 118b) provide additional paths for optical signals to travel between the first primary waveguide 110 and the second primary waveguide 120.

More specifically, as mentioned above, each of the exemplary PIC structure embodiments 100(1)-100(9), the second end portion 121 of the second primary waveguide 120 can at least partially underlay or partially overlay (as applicable, depending upon whether the second primary waveguide is below or above the first primary waveguide) the first end portion 111 of the first primary waveguide 110. Thus, in operation, optical signals can pass between the first end portion 111 of the first primary waveguide 110 and the second end portion 121 of the second primary waveguide 120 at adjacent locations where mode matching occurs. Additionally, as mentioned above, the second end portion 121 of the second primary waveguide 120 can be relatively wide as compared to the first end portion 111 of the first primary waveguide 110 and in each of the exemplary PIC structure embodiments 100(1)-100(9), the second end portion 121 of the second primary waveguide 120 can also at least partially underlay or partially overlay (as applicable) the distal portion 117 of each supplemental waveguide (e.g., 115a and/or 115b). Thus, in operation, optical signals can also pass between the second end portion 121 of the second primary waveguide 120 and the distal portion 117 at each supplemental waveguide 115a and/or 115b at adjacent locations where mode matching occurs. Additionally, as mentioned above, each proximal portion 116 of each supplemental waveguide (e.g., 115a and/or 115b) is positioned laterally adjacent to the first end portion 111 of the first primary waveguide 110. Thus, in operation, optical signals can pass between the proximal portion 116 of each supplemental waveguide 115a and/or 115b and the first end portion 111 of the first primary waveguide 110 at adjacent locations where mode matching occurs.

Furthermore, in the exemplary PIC structure embodiments that include one or more additional supplemental waveguides 118a and/or 118b (e.g., see PIC structure embodiments 100(6) of FIGS. 6A-6F, 100(7) of FIG. 7 and 100(9) of FIG. 9) the second end portion 121 of the second primary waveguide 120 can also partially underlay or partially overlay (as applicable) or can be close thereto on the diagonal. Thus, optical signals can pass between the second end portion 121 of the second primary waveguide 120 and the distal portion at each additional supplemental waveguide 118a and/or 118b at adjacent locations where mode matching occurs. Additionally, as mentioned above, each proximal portion of each additional supplemental waveguide 118a and/or 118b is positioned laterally adjacent to the proximal end of an adjacent supplemental waveguide 115a and/or 115b, respectively, so that optical signals can pass between those adjacent proximal ends where mode matching occurs.

The arrangement of the first end portion 111 of the first primary waveguide 110, the second end portion 121 of the second primary waveguide 120, and the supplemental waveguide(s) 115a and/or 115b and, optionally, 118a and/or 118b allows for mode matching conditions to be met at multiple locations at the interface between the first primary waveguide 110 and the second primary waveguide 120, thereby creating multiple signal paths between the first and second primary waveguides and effectively reducing the light signal power density in any one path to prevent or at least minimize any power-induced damage.

Also disclosed herein are method embodiments for forming the above-described PIC structure embodiments. In these method embodiments, conventional waveguide processing techniques can be used to form the above-described first and second primary waveguides 110 and 120. However, during formation of the first primary waveguide, supplemental waveguide(s) (as described above) can be concurrently formed. For example, a first core material layer can be deposited and the shapes for the first primary waveguide 110, the supplemental waveguide(s) 115a and/or 115b and, optionally, the additional supplemental waveguide(s) 118a and/or 118b can be patterned and etched using the first core material layer. Furthermore, the second primary waveguide 120 can be formed such that it is positioned adjacent the first primary waveguide 110 and the supplemental waveguide(s) (as described above in the different exemplary PIC structure embodiments). This method is used in the fabrication of photonic integrated circuit (PIC) chips. The resulting PIC chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It should be understood that the terminology used herein is for the purpose of describing the disclosed structures and methods and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "in direct contact", "abutting", "directly adjacent to", "immediately adjacent to", etc., are intended to indicate that at least one element physically contacts another element (without other elements separating the described elements). The term "laterally" is used herein to describe the relative locations of elements and, more particularly, to indicate that an element is positioned to the side of another element as opposed to above or below the other element, as those elements are oriented and illustrated in the drawings. For example, an element that is positioned laterally adjacent to another element will be beside the other element, an element that is positioned laterally immediately adjacent to another element will be directly beside the other element, and an element that laterally surrounds another element will be adjacent to and border the outer sidewalls of the other element. The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
    a first primary waveguide with a first main body and a first end portion, wherein the first end portion is tapered and has an end wall;
    two supplemental waveguides on opposing sides of the first end portion of the first primary waveguide, wherein each supplemental waveguide has a proximal portion positioned laterally adjacent to the first end portion of the first primary waveguide and a distal portion extending beyond the end wall of the first end portion, and wherein the distal portion is tapered; and
    a second primary waveguide with a second main body and a second end portion, wherein the second end portion of the second primary waveguide is adjacent to and any one of partially overlays and partially underlays at least the distal portion of each supplemental waveguide.

2. The structure of claim 1,
    wherein the second end portion of the second primary waveguide at least partially underlays or at least partially overlays the first end portion of the first primary waveguide and the distal portion of each supplemental waveguide.

3. The structure of claim 2, wherein the distal portion of each supplemental waveguide is curved.

4. The structure of claim 2, further comprising:
    a first cladding material layer, wherein the first primary waveguide and each supplemental waveguide are on the first cladding material layer;
    a second cladding material layer laterally surrounding the first primary waveguide and each supplemental waveguide; and
    at least one additional cladding material layer on the second cladding material layer, the first primary waveguide, and each supplemental waveguide,
    wherein the second primary waveguide is on the at least one additional cladding material layer such that the second end portion of the second primary waveguide at least partially overlays the first end portion of the first primary waveguide and the distal portion of each supplemental waveguide.

5. The structure of claim 1, wherein the first primary waveguide, each supplemental waveguide and the second primary waveguide are ridge-type waveguides or rib-type waveguides.

6. The structure of claim 1, wherein the first main body of the first primary waveguide is a rib-type portion and the first end portion of the first primary waveguide is a ridge-type portion.

7. The structure of claim 1,
    wherein the structure further comprises two additional supplemental waveguides, and
    wherein each supplemental waveguide is positioned laterally between an additional supplemental waveguide and the first primary waveguide.

8. The structure of claim 1, wherein the first primary waveguide and each supplemental waveguide comprise silicon and wherein the second primary waveguide comprises silicon nitride.

9. A structure comprising:
    a first primary waveguide with a first main body and a first end portion with an end wall, wherein the first end portion is tapered;

two supplemental waveguides on opposing sides of the first end portion of the first primary waveguide, wherein each supplemental waveguide has a proximal portion positioned laterally adjacent to the first end portion of the first primary waveguide and a distal portion that extends beyond the end wall of the first end portion and is tapered; and a second primary waveguide with a second main body and a second end portion, wherein the second end portion of the second primary waveguide is adjacent to and any one of partially overlays and partially underlays the first end portion of the first primary waveguide and distal portions of the two supplemental waveguides.

10. The structure of claim 9, wherein the first primary waveguide, each of the two supplemental waveguides, and the second primary waveguide are surrounded by cladding material.

11. The structure of claim 10,
wherein the second end portion of the second primary waveguide is tapered, and
wherein the distal portions of the two supplemental waveguides are curved.

12. The structure of claim 10, further comprising:
a first cladding material layer, wherein the first primary waveguide and the two supplemental waveguides are on the first cladding material layer;
a second cladding material layer laterally surrounding the first primary waveguide and the two supplemental waveguides; and
at least one additional cladding material layer on the second cladding material layer, the first primary waveguide, and the two supplemental waveguides,
wherein the second primary waveguide is on the at least one additional cladding material layer.

13. The structure of claim 9, wherein the first primary waveguide, each supplemental waveguide and the second primary waveguide are ridge-type waveguides or rib-type waveguides.

14. The structure of claim 9, wherein the first main body of the first primary waveguide is a rib-type portion and the first end portion of the first primary waveguide is a ridge-type portion.

15. The structure of claim 9, further comprising: two additional supplemental waveguides, wherein each supplemental waveguide is between an additional supplemental waveguide and the first primary waveguide.

16. The structure of claim 15, wherein the second end portion of the second primary waveguide is entirely offset from the two additional supplemental waveguides.

17. The structure of claim 15, wherein the second end portion of the second primary waveguide at least partially overlays distal portions of the two additional supplemental waveguides that extend beyond the first end portion of the first primary waveguide.

18. The structure of claim 17, wherein the distal portions of the two additional supplemental waveguides are any of tapered and curved.

19. The structure of claim 9, wherein the first primary waveguide and the supplemental waveguides comprise silicon and wherein the second primary waveguide comprises silicon nitride.

20. A structure comprising:
a first primary waveguide with a first main body and a first end portion with an end wall, wherein the first end portion is tapered;
two supplemental waveguides on opposing sides of the first end portion of the first primary waveguide, wherein each supplemental waveguide has a proximal portion positioned laterally adjacent to the first end portion of the first primary waveguide and a distal portion that extends beyond the end wall of the first end portion and is tapered; and
a second primary waveguide with a second main body and a second end portion, wherein the second end portion of the second primary waveguide only partially overlays the first end portion of the first primary waveguide and distal portions of the two supplemental waveguides.

* * * * *